US009282432B1

(12) United States Patent
Chang et al.

(10) Patent No.: US 9,282,432 B1
(45) Date of Patent: *Mar. 8, 2016

(54) AGGREGATED GEO-FENCING AREA BASED INFORMATION DELIVERY

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/695,134

(22) Filed: Apr. 24, 2015

Related U.S. Application Data (63) Continuation of application No. 14/465,332, filed on Aug. 21, 2014.

(51) Int. Cl.
*H04W 24/00* (2009.01)
*H04W 4/02* (2009.01)

(52) U.S. Cl.
CPC .............. *H04W 4/021* (2013.01); *H04W 4/028* (2013.01)

(58) Field of Classification Search
CPC ....... H04W 4/021; H04W 4/02; H04W 64/00; H04L 29/08657; H04L 29/08108; H04L 29/08936
USPC ....................................................... 455/456.3
See application file for complete search history.

(56) References Cited

U.S. PATENT DOCUMENTS

| 6,618,593 | B1 * | 9/2003 | Drutman et al. ............ 455/456.3 |
|---|---|---|---|
| 8,666,436 | B2 * | 3/2014 | Ellanti et al. .................. 455/457 |
| 8,942,995 | B1 * | 1/2015 | Kerr ........................... 705/14.67 |
| 8,977,296 | B1 * | 3/2015 | Briggs et al. ............... 455/456.3 |
| 2008/0091786 | A1 * | 4/2008 | Jhanji ........................... 709/206 |
| 2009/0207015 | A1 * | 8/2009 | Diem ....................... 340/539.13 |
| 2010/0279712 | A1 * | 11/2010 | Dicke et al. ................ 455/456.5 |
| 2011/0066366 | A1 * | 3/2011 | Ellanti et al. .................. 701/201 |
| 2011/0178811 | A1 * | 7/2011 | Sheridan ........................ 705/1.1 |
| 2013/0031047 | A1 | 1/2013 | Boazi et al. |
| 2013/0085860 | A1 * | 4/2013 | Summers et al. .......... 705/14.58 |
| 2013/0144523 | A1 * | 6/2013 | Haney ........................... 701/482 |

(Continued)

OTHER PUBLICATIONS https://www.waze.com/, Free Community-based Mapping, Traffic & Navigation App, printed on Jul. 31, 2014, 3 pages.

(Continued)

*Primary Examiner* — Juan A Torres
(74) *Attorney, Agent, or Firm* — Scully, Scott, Murphy & Presser, P.C.

(57) ABSTRACT

Aggregated geo-fencing area based information delivery, in one aspect, may include determining a plurality of first geo-fencing areas of a first user based on monitoring or detecting locations of the first user. The locations may be detected via one or more user selected devices, which include location-aware devices such as GPS receiver/transmitter devices. A second user identifier may be received from the first user. One or more second geo-fencing areas of a second user may be determined, for example, similarly to the first geo-fencing areas. Content may be gathered based on aggregated geo-fencing area comprising the plurality of first geo-fencing areas and the one or more second geo-fencing areas. The content associated with the aggregated geo-fencing area may be presented, for example, for collaborative activity among the users.

8 Claims, 4 Drawing Sheets

(56) References Cited

U.S. PATENT DOCUMENTS

| | | | |
|---|---|---|---|
| 2013/0150086 A1* | 6/2013 | Caralis et al. | 455/456.3 |
| 2013/0203442 A1* | 8/2013 | LeBlanc et al. | 455/456.3 |
| 2013/0225196 A1 | 8/2013 | James et al. | |
| 2014/0155094 A1* | 6/2014 | Zises | 455/456.3 |
| 2014/0156410 A1* | 6/2014 | Wuersch et al. | 705/14.58 |
| 2014/0213280 A1* | 7/2014 | Sandel et al. | 455/456.1 |
| 2014/0365307 A1* | 12/2014 | Cheung | 705/14.58 |

OTHER PUBLICATIONS http://www.spyvsspy.com/gps.html, "Geo-Fencing in Real-Time GPS Tracking Devices", printed on Jul. 31, 2014, 5 pages.

http://en.wikipedia.org/wiki/Geo-fence, "Geo-fence", last modified on Jul. 23, 2014, 3 pages.

List of IBM Patents or Patent Applications Treated as Related, dated Apr. 24, 2015, 2 pages.

\* cited by examiner

AGGREGATED GEO-FENCING AREA BASED INFORMATION DELIVERY

FIELD

The present application relates generally to computers, and computer applications, and more particularly to aggregated geo-fencing area based information delivery.

BACKGROUND

Geo-fence refers to a virtual perimeter of a geographic area. Applications of geo-fence include detecting crossing of such geo-fences, for example, for ensuring safety. For example, geo-fence techniques may be used to let parents know if their small children travel outside a neighborhood or other set region, and/or to recover stolen vehicles. Geo-fence techniques may be also used to notify one if someone, e.g., a friend is traveling in the same area. Computer-implemented systems or applications in conjunction with Global Positioning System devices may detect such crossing and provide notifications, for instance, via mobile or another device.

BRIEF SUMMARY

A method for aggregated geo-fencing area based information delivery, in one aspect, may comprise determining a plurality of first geo-fencing areas of a first user based on detecting locations of the first user. The locations may be detected via one or more user selected devices. The method may also comprise receiving a second user identifier from the first user. The method may further comprise determining one or more second geo-fencing areas of a second user. The method may further comprise aggregating the plurality of first geo-fencing areas and the one or more second geo-fencing areas into aggregated geo-fencing area. The method may further comprise gathering content associated with the aggregated geo-fencing area. The method may also comprise presenting the content associated with the aggregated geo-fencing area.

A system for providing aggregated geo-fencing area based information delivery, in one aspect, may comprise a processor and a storage device. The processor may be operable to determine a plurality of first geo-fencing areas of a first user based on monitoring locations of the first user, information associated with the locations received from one or more user selected devices equipped with one or more global positioning system receiver/transmitter devices. The processor may be further operable to store information associated with the plurality of first geo-fencing areas in the storage device. The processor may be further operable to receive a second user identifier from the first user. The processor may be further operable to determine one or more second geo-fencing areas of a second user and store information associated with said one or more second geo-fencing areas in the storage device. The processor may be further operable to aggregate the plurality of first geo-fencing areas and the one or more second geo-fencing areas into aggregated geo-fencing area and store information associated with the aggregated geo-fencing area in the storage device. The processor may be further operable to gather content associated with the aggregated geo-fencing area at least by searching online network information. The processor may be further operable to present the content associated with the aggregated geo-fencing area to at least one of the first user and the second user.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Geo-fence or geo-fencing provides a virtual perimeter or boundary for an area, a real geographical area or region. A user may have one or more geo-fencing areas, for example, a predefined area boundary near the user's office, user's residence, a club, and/or others. At the same time, one user can have multiple family members and friends, social network friends, who may also have their own one or more geo-fencing areas. In one embodiment of the present disclosure, a methodology may be provided that aggregate the geo-fencing areas of a user and/or multiple users, e.g., a user and user's friends or family members, and deliver appropriate information to the user.

In the below description, the terms, "first user" and "second user" are employed only to provide a clearer description in explaining different users among multiple users or set of users. Such terms do not connote or imply any order or sequence.

Figure 1:
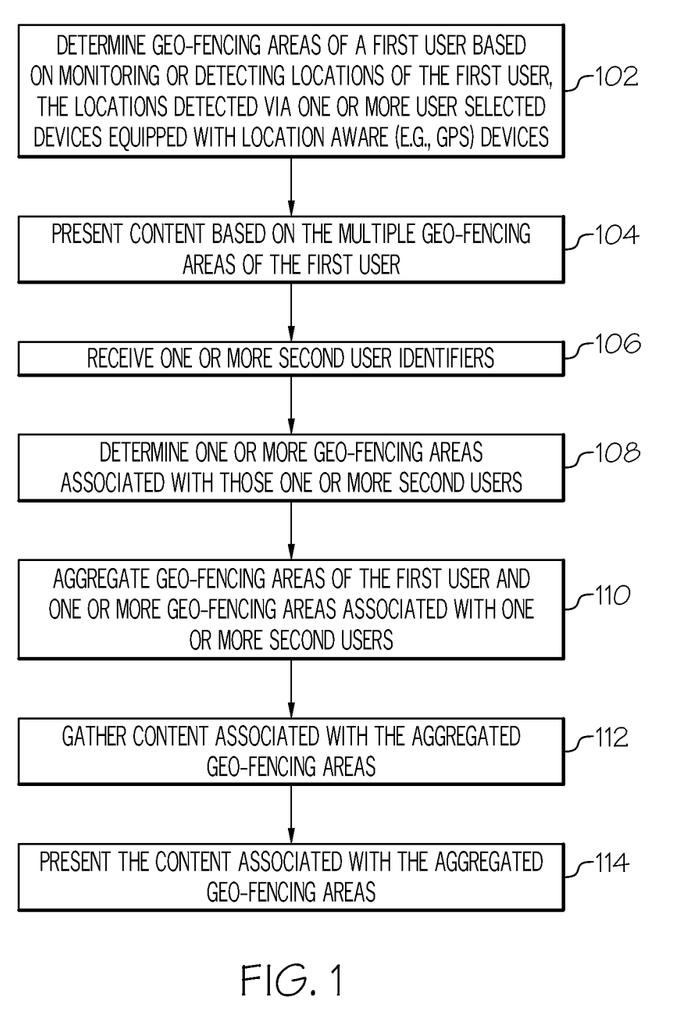
FIG. 1 is a flow diagram illustrating an aggregated geo-fencing area based information delivery method in one embodiment of the present disclosure.

FIG. 1 is a flow diagram illustrating an aggregated geo-fencing area based information delivery method in one embodiment of the present disclosure. At 102, a user's geo-fencing areas are identified. For example, a plurality of geo-fencing areas of a first user may be determined based on detecting locations of the first user, the locations detected via one or more user selected devices. In one aspect, for example, a registration request may be received from the first user identifying devices for detecting location of the first user, for instance, the devices which the first user selects or identifies as permissible or allowable to use for detecting the location of the first user. The location of the first user then may be monitored based on information received from the selected devices. The history of locations, rate of movement and timing information, e.g., the time of day or week or time and date, or another, may be stored.

The history of locations, rate of movement, and timing information are analyzed to determine aggregated geo-fencing area for the first user. For instance, the stored information may provide the first user's mobility pattern (pattern of movement) and duration of time spent in different places. Based on such information, the first user's possible residence address, office address, club address, community center, and/or others, may be calculated.

For instance, inference may be made based on the time and duration spent in a location as to whether the location is a user's residence, workplace, or another. In another aspect, a user may be presented with the calculated location information and asked to verify or confirm the locations, e.g., as being the user's residence, office, or another.

Yet in another aspect, a user may be provided with an option to enter or confirm the user's geo-fencing perimeter around the identified locations. For instance, the identified information from the analysis of the history of locations, rate of movement, and time, may be presented to the user and the user may be provided with a user interface to allow the user to enter or define the user's geo-fencing boundary, e.g., 1 kilometer radius around the user's office address and 2 kilometer radius around the user's home address, and so forth.

In this way, multiple geo-fencing areas may be determined or identified associated with a user, e.g., the first user.

In one aspect, content may be presented to a user, e.g., the first user, based on the identified multiple geo-fencing areas of the first user as shown at 104. For example, an individual's (e.g., the first user's) multiple geo-fencing areas may be aggregated, and appropriate content may be provided to that individual.

In another aspect, appropriate content may be provided based on a user's aggregated geo-fencing area, the current location of the user, and one or more rules which may have been predefined, e.g., by the user. For instance, the one or more rules may specify to present certain information to the user if the user is currently located within one of the multiple geo-fencing areas. The rules may be adjusted. For instance, a user interface may be provided to allow a user to define and redefine or adjust the rules.

At 106, one or more second user identifiers may be received. For example, a user interface may be provided to allow a user to specify one or more other users. For example, a first user may specify one or more second users, e.g., who may be a friend or a family member, with whose geo-fencing area or areas the first user would like to have his or her geo-fencing areas to be aggregated for delivery of information.

At 108, one or more geo-fencing areas (e.g., also referred to as second geo-fencing area or areas) associated with those one or more other users (e.g., also referred to as a second user or second users) may be determined. For example, similar methodology described above with respect to determining one or more geo-fencing areas of the first user may be employed to determine a geo-fencing area or areas for one or more other users. For instance, the first user with a permission of the second user may specify second user's one or more devices that may be used to monitor the locations of the second user. As another example, the second user may be already a registered user who has registered one or more of his or her devices. In this case, for example, the second user's geo-fencing areas may already have been determined, e.g., according to the similar methodology described above with reference to determining the first user's geo-fencing areas.

Yet as another example, the second user may be a registered user, who may be asked to enter or specify one or more devices with which the second user's locations can be monitored. So for example, with the information from the specified devices of the second user, the second user's geo-fencing areas may be determined using the similar methodology described above with reference to determining the first user's geo-fencing areas.

As another example, the second user's one or more geo-fencing areas may be determined by the first user simply specifying the second user's one or more geo-fencing areas.

At 110, the plurality of first geo-fencing areas (e.g., geo-fencing areas of the first user) and the one or more second geo-fencing area (e.g., one or more geo-fencing areas of one or more second user) are aggregated. For clarity of explanation the plurality of first geo-fencing areas and the one or more second geo-fencing area that are aggregated are referred to as aggregated geo-fencing area. For example, aggregation defines geo-fencing areas from which information may be searched. For instance, the first user's profile such as user's likes, dislikes, and/or others may be gathered and used to find appropriate information from the aggregated geo-fencing area.

At 112, content may be gathered using information associated with the aggregated geo-fencing area. For example, content may include information about entities in or activities that can occur within the aggregated geo-fencing area. Content may be advertisements, e.g., of services or items or the like that can be obtained within the aggregated geo-fencing area. Content may be information describing social gathering opportunities, collaborative assistance, buying opportunities, selling offers, and/or others.

At 114, the content or information gathered associated with the aggregated geo-fencing area may be presented or provided to one or more of the first user and one or more second users. In one aspect, one or more rules may be employed to specify to whom and/or when the information or content should be presented. For example, one or more rules may specify to present the information based on a current location of one or more users, e.g., one or more of the first user and the one or more second users. In one aspect, the content may be presented with the information such as the associated geo-fencing area and the user associated with that geo-fencing area.

In this way, information such as advertisements may be consolidated between a user and one or more other users. Such consolidated information may assist a user (e.g., a first user) to request another user (e.g., a second user) to purchase products for the first user based on the proximity of the second user to a location to purchase products. Other uses of the consolidated information may be to coordinate activities of the users involved.

For example, User A, User B, User C are close friends, and they also have their own different geo-fencing areas. The methodology of the present disclosure in one embodiment identifies the geo-fencing areas of those users, and delivers consolidated advertisement (or other information) to one or more of those users (e.g., User A, User B, and User C). Thus, any user can purchase for his friend or friends upon receiving a request from one friend. For example, User A knows one of his required products is available within the geo-fencing area of User C, so user A can request User C to purchase the product for him.

Figure 2:
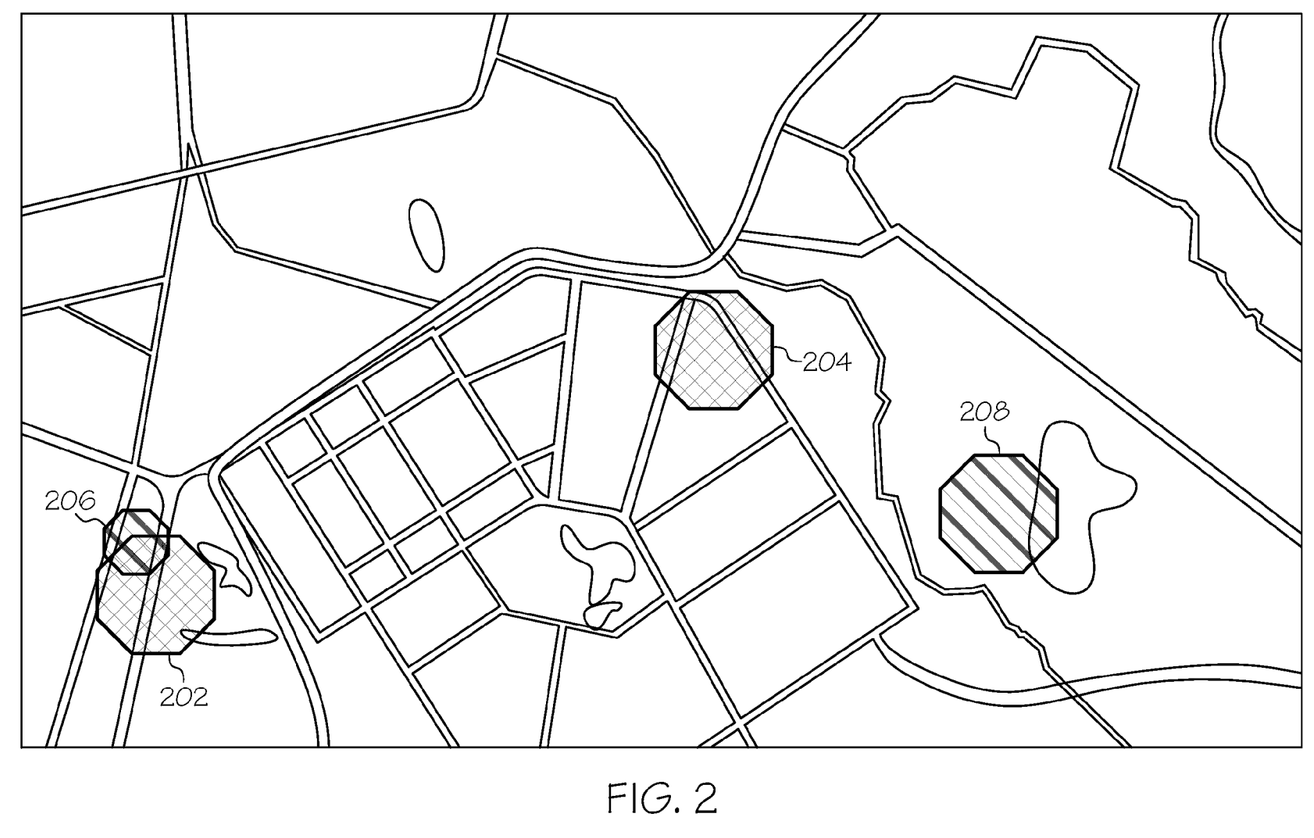
FIG. 2 illustrates an example of a geographical map with geo-fences of multiple users in one embodiment of the present disclosure.

FIG. 2 illustrates an example of a geographical map with geo-fences of multiple users in one embodiment of the present disclosure. User A has a geo-fencing area 202 near the user A's residence area, a geo-fencing area 204 near the user A's office area. User B has a geo-fencing area 206 near the user B's residence area, and a geo-fencing area 208 near the user B's office area. A methodology of the present disclosure in one embodiment may aggregate the geo-fencing areas of user A and user B (e.g., 202, 204, 206 and 208), and deliver or present combined content associated with all those geo-fencing areas.

Figure 3:
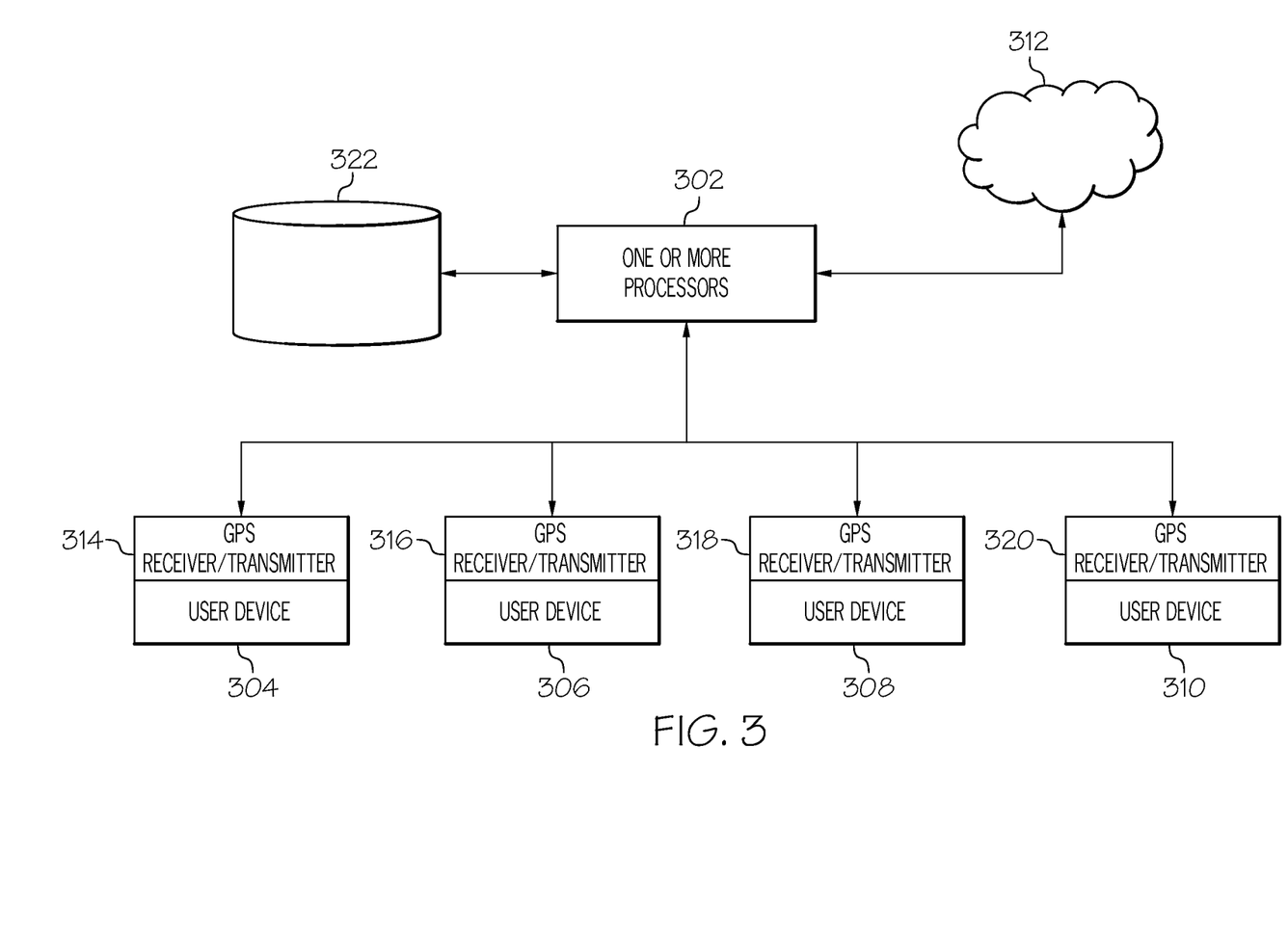
FIG. 3 is a block diagram that illustrates components of a system of the present disclosure in one embodiment.

FIG. 3 is a block diagram that illustrates components that may implement a methodology of the present disclosure in one embodiment. One or more processors 302 may determine a plurality of first geo-fencing areas of a first user based on monitoring locations of the first user, for example, from information associated with the locations detected via one or more user selected devices (e.g., 304, 306) and received from those one or more users selected devices (e.g., 304, 306). For example, one or more user selected devices may be equipped with or include one or more global position system (GPS) receiver/transmitter devices (e.g., 314, 316). The processor may store information associated with the plurality of first geo-fencing areas in a storage device (e.g., 322).

The processor 302 may receive one or more second user identifiers from the first user. For example, a user interface running on the processor may enable or allow the first user to enter one or more identifiers of respective one or more second users, with whom the first user would like to aggregate geo-fencing areas. Upon establishing proper permissions, one or more devices of one or more second users (e.g., 308, 310) that are equipped with one or more GPS receiver/transmitter (e.g., 318, 320) or like location information aware devices, may be monitored, and one or more geo-fencing areas (e.g., referred to as second geo-fencing areas) for one or more second users may be also determined, for example, in a similar manner as done in the case of the first user, e.g., described with reference to FIG. 1. User devices, e.g., 304, 306, 308, 310, may be mobile devices or others, e.g., than can transmit information via wireless technology, for example, from various locations to the one or more processors 302. The processor may store information associated with one or more second geo-fencing areas in the storage device (e.g., 322).

The processor 302 may aggregate the plurality of first geo-fencing areas and the one or more second geo-fencing areas into aggregated geo-fencing area. For instance, geo-fencing area may be identified based on user's mode of travel, frequency of travel, time spent, and/or others, e.g., by analyzing historical data comprising the user's mode of travel, frequency of travel, time spent, and/or others. Multiple friends may be selected and aggregated geo-fencing area may be created that include the geo-fencing areas of the friends or the like.

The processor 302 may gather content or information associated with the aggregated geo-fencing area. For example, the location data of areas in the aggregated geo-fencing area may be used to search for information associated with those areas, e.g., items or services that are available (e.g., for purchase) in those areas, activities that can be performed in those areas, and/or others. Content that is presented may include such information, e.g., advertisements for such information. The information may be gathered from searching an online network 312, for example, the Internet, in one embodiment.

The processor 302 may present the content to one or more users, for example, at least one of the first user and one or more second users. The content may be presented on one or more of the user devices 304, 306, 308, 310, and/or another device.

In one embodiment, the content may be presented based on one or more rules, which a user may be allowed to define and modify, e.g., via a user interface provided on the one or more processors 302. Such user interface may also allow a user to specify one or more second users with whom to aggregate geo-fencing areas for presentation of combined content. One or more second users may be friends or family of the user (e.g., first user). The content or information may include advertisement, social gathering opportunities, collaborative assistance, buying opportunities, selling offers, and/or others. The combined content may help users and/or advertises to purchase and/or sell a product, item or service in a collaborative manner.

In one aspect, a user can also dynamically select different participating friends, and accordingly aggregated geo-fencing area can be created. In another aspect, a user can also cluster the aggregated geo-fencing area based on different parameters, for example, close friends, family members, project team, etc. Based on the cluster type, aggregated geo-fencing area may be created. For example, the first user may be enabled to cluster the aggregated geo-fencing area based on one or more parameters in one or more cluster types. Examples of cluster types may include one or more of friends, family, and project team. The aggregated geo-fencing area may be created based on the one or more cluster types.

A set of geo-fencing may be determined dynamically. For example, geo-fencing areas may be set dynamically, for instance, changed with time, e.g., time of day or time of week. For example, User A may be in a routing business and his shift coverage may be from 9 am-5 pm, and would like to see multiple geo-fencing areas from his coworkers during his shift coverage. But once User A's shift (job) is completed, User A may go home and may not be interested in those geo-fencing areas, but instead would like to see or utilize family and friends' geo-fencing areas. Thus, a geo-fencing pattern may vary based on time pattern (e.g., weekday, week night, and/or weekend).

Figure 4:
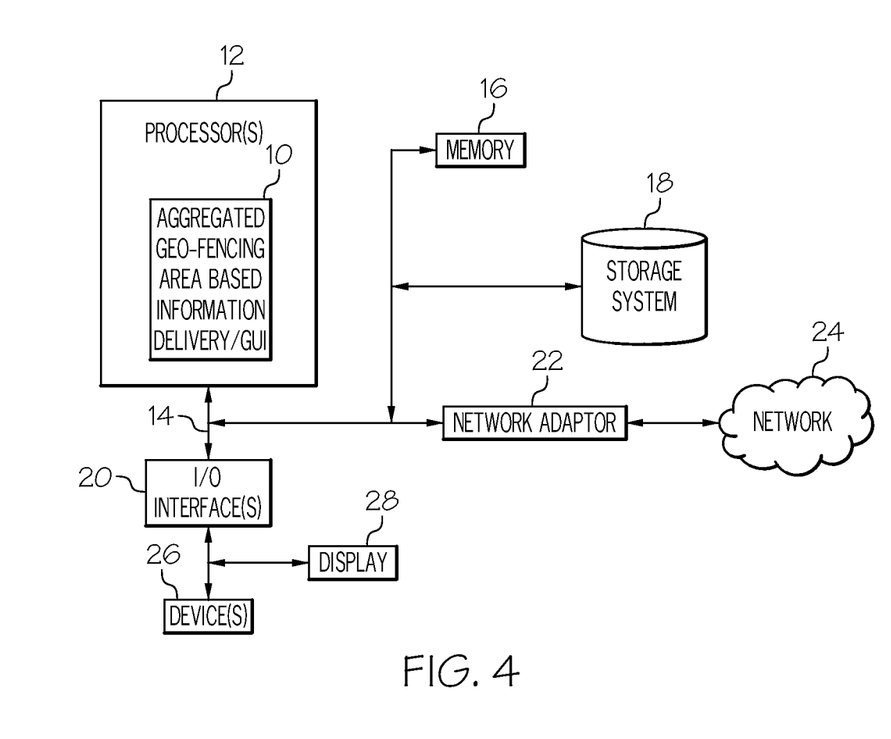
FIG. 4 illustrates a schematic of an example computer or processing system that may implement an aggregated geo-fencing area based information delivery system in one embodiment of the present disclosure.

FIG. 4 illustrates a schematic of an example computer or processing system that may implement an aggregated geo-fencing area based information delivery system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for aggregated geo-fencing area based information delivery, comprising:
    determining, by a processor, a plurality of first geo-fencing areas of a first user based on detecting locations of the first user, the locations detected via one or more user selected devices;
    receiving, by the processor, a second user identifier from the first user;
    determining, by the processor, one or more second geo-fencing areas of a second user;
    aggregating, by the processor, the plurality of first geo-fencing areas and the one or more second geo-fencing areas into aggregated geo-fencing area;
    gathering, by the processor, content associated with the aggregated geo-fencing area; and
    presenting, by the processor, the content associated with the aggregated geo-fencing area.

2. The method of claim 1, wherein the presenting content comprises presenting content based on the aggregated geo-fencing area to one or more of the first user and the second user.

3. The method of claim 1, wherein said gathering content associated with the aggregated geo-fencing area is based on one or more rules.

4. The method of claim 1, wherein said determining a plurality of first geo-fencing areas of a first user comprises:
    receiving a registration request from the first user identifying said one or more user selected devices;
    monitoring the locations of the first user based on information received from the one or more user selected devices;
    storing a history of the monitored locations, rate of movement and timing information based on said monitoring; and
    analyzing the history of the monitored locations, rate of movement and timing information to determine the plurality of first geo-fencing areas of a first user.

5. The method of claim 1, further comprising:
    presenting information associated with the plurality of first geo-fencing areas.

6. The method of claim 3, wherein said one or more rules comprise one or more user defined rules.

7. The method of claim 4, wherein the timing information comprises duration of time spent in the monitored locations and time and date spent in the monitored locations.

8. The method of claim 4, further comprising:
    allowing the first user to specify a distance radius from one or more of the monitored locations, wherein the plurality of first geo-fencing areas is calculated based on the user specified distance radius.

* * * * *